3,318,880
NOVEL [1,2-α]IMIDAZOPYRIDINES AND A PROCESS FOR THE MANUFACTURE THEREOF
Luigi Almirante, Milan, Walter Murmann, Arona, and Luigi Polo Friz, Milan, Italy, assignors to Laboratorio Bioterapico Milanese Selvi & C. S.a.s., Milan, Italy
No Drawing. Filed Apr. 17, 1964, Ser. No. 360,737
Claims priority, application Italy, Apr. 30, 1963, 8,939/63
12 Claims. (Cl. 260—247.1)

The present invention concerns substituted 2-aryl[1,2-α]imidazopyridines and a process for the manufacture thereof.

The substituted 2-aryl[1,2-α]imidazopyridines provided by the invention are compounds of the general Formula I:

General Formula I wherein $R_1$ is a hydrogen atom or a lower alkyl radical or a lower alkoxy radical at positions 5, 6, 7, 8 of the imidazopyridine nucleus, $R_2$ is a hydrogen atom or a dialkylaminomethyl group of the Formula II:

$$-CH_2-N\begin{matrix}R_4\\R_5\end{matrix}$$

Formula II wherein $R_4$ and $R_5$ individually represent alkyl groups or, together with the nitrogen atom to which they are attached, a five or six-membered heterocyclic ring, such as pyrrolidino, piperidino, morpholino, piperazine, methylpiperazino or (β-hydroxyethyl) piperazine; $R_3$ is a lower alkylmercapto, alkylsulfoxy or alkylsulfonyl group, such as $CH_3S-$, $CH_3SO-$ or $CH_3SO_2-$, at positions 2', 3', 4' of the benzene nucleus; and acid addition salts thereof.

These compounds and salts have antiphlogistic and antipyretic properties; they are active by oral or parenteral administration and their toxicity is very low.

The $LD_{50}$ of 2(4'-methylsulfonylphenyl)[1,2-α]imidazopyridine, for instance, when given by mouth to Sprague Dawley rats, was found to be 3710 (4092–3365) mg./kg., compared with that of aminopyrine 1500 (1370–1643) mg./kg. and that of phenylbutazone 467 (414–527) mg./kg.

The anti-inflammatory effect in the experimental acute kaolin-induced inflammation of the rat paw, after administration of the above compound, by the oral route, has proven to be at least 3–4 times that of equitoxic doses of phenylbutazone.

Some of the new imidazopyridines of general Formula I, are effective antipyretic agents against fever produced by yeast injected subcutaneously in rats. When administered orally, 2(4'-methylsulfonylphenyl)[1,2-α]imidazopyridine, for instance, is at least 8 times as potent as aminopyrine at peak effect.

The compounds of general Formula I have shown a considerable analgesic activity in different experimental models such as Haffner's method (application of pressure to the root of the mouse tail), Randall's method (local pressure applied to the normal and/or inflamed tissue of the rat paw), and the hot-plate method.

The salts of the invention are acid addition salts with inorganic acids such as hydrochloric acid, hydrobromic acid, sulfuric acid or phosphoric acid, or with organic acids such as tartaric acid, malic acid, citric acid, ethanosulfonic acid or maleic acid.

The compounds of general Formula I can be obtained in good yields, by reacting a 2-aminopyridine of Formula III with a halogeno-acetophenone of Formula IV and condensing the [1,2-α]imidazopyridines of the Formula V (or Formula I wherein $R_2=H$), so prepared, with formaldehyde and an amine of Formula VI (wherein $R_4$ and $R_5$ have the meaning given above), according to the equation:

Formula III        Formula IV

Formula V                Formula VI
(or Formula I wherein $R_2=H$)

(Formula I wherein $R_2=-CH_2-N\begin{matrix}R_4\\R_5\end{matrix}$)

The reaction of the components III and IV may be effected in a solvent which is inert under the conditions of the reaction, heating the mixture or leaving it at room temperature for many hours.

The relative amounts of the components are stoichiometric, or an excess of 2-aminopyridines can be used.

The reaction of the components of Formulas V and VI may be effected with stoichiometric amounts or with an excess of formaldehyde or with a product that gives formaldehyde by decomposing, in a solvent which is inert under the conditions of the reaction, heating the mixture or leaving it at room temperature, in acidic or neutral conditions.

The invention is illustrated by the following examples:

*Example I*

95 g. of 2-aminopyridine were dissolved in 250 ml. of dioxane and the solution was reacted with 245 g. of o-methylmercapto-ω-bromoacetophenone. After 5 hours at room temperature the 2(2'-methylmercaptophenyl)[1,2-α]imidazopyridine precipitate was filtered, washed with a solution of sodium bicarbonate and recrystallized by water.

*Example II*

95 g. of 2-aminopyridine were dissolved in 250 ml. of dioxane and the solution was reacted with 245 g. of p-methylmercapto-ω-bromoacetophenone. After 5 hours at room temperature, the solution was alkalized with sodium hydroxide and the 2(4'-methylmercaptophenyl)[1,2-α]imidazopyridine precipitate was filtered, washed and recrystallized by diluted alcohol.

*Example III*

190 g. of 2-aminopyridine were dissolved in 350 ml. of dioxane and the solution was reacted with 277 g. of p-methylsulfonyl-ω-bromoacetophenone. After two hours at room temperature the 2(4'-methylsulfonylphenyl)[1,2-α]imidazopyridine was filtered, washed and recrystallized by alcohol.

Example IV 214 g. of 2-amino-4-methyl-pyridine were dissolved in 350 ml. of alcohol and the solution was reacted with 277 g. of p-methylsulfonyl-ω-bromoacetophenone. After 5 hours at room temperature, the mixture was heated at 50° C. for one hour and, after chilling, was filtered and recrystallized by methanol, the 2(4'-methylsulfonylphenyl)-7-methyl[1,2-α]imidazopyridine.

Example V 123 g. of 2-amino-5-methoxy-pyridine were dissolved in 250 ml. of dioxane and reacted with 277 g. of p-methylsulfonyl-ω-bromoacetophenone. After 2 hours at room temperature, the mixture was heated at 50° C. for one hour and alkalized with sodium carbonate. The 2(4'-methylsulphonylphenyl) - 6-methoxy[1,2-α]imidazo pyridine was filtered, after chilling and recrystallized by alcohol.

Example VI 272 g. of 3(4'-methylsulfonylphenyl)[1,2-α]imidazopyridine were diluted with 600 ml. of glacial acetic acid and reacted with 87 g. of morpholine and 46 g. of a 40% formaldehyde solution in water. After 2 hours the excess of acetic acid was evaporated and the residue taken into water and sodium bicarbonate.

The 2(4' - methylsulfonylphenyl) - 3 - morpholinomethyl[1,2-α]imidazopyridine was separated by filtration and recrystallized by alcohol.

The following compounds were prepared in a similar fashion: from 2(4' - methylmercaptophenyl)[1,2-α]imidazopyridine, piperidine and formaldehyde in acetic acid:

2(4'-methylmercaptophenyl)-3-piperidinomethyl
[1,2-α]imidazopyridine.
From 2(4' - methylsulfonylphenyl[1,2 - α]imidazopyridine, dimethylamine and formaldehyde in diluted hydrochloric acid:

2(4'-methylsulfonylphenyl)-3-dimethylaminomethyl
[1,2-α]imidazopyridine.

Example VII 272 g. of 2(2'-methylsulfonylphenyl)-7-methyl[1,2-α]imidazopyridine were diluted with hydrochloric acid 10% and reacted with 130 g. of N-(β-hydroxyethyl)-piperazine and 100 g. of paraformaldehyde. The mixture was heated for 3 hours and, after chilling the 2(2'-methylsulfonylphenyl) - 3 - (4" - β - hydroxyethyl) piperazinomethyl-[1,2-α]imidazopyridine was filtered and recrystallized by alcohol.

Example VIII 272 g. of 2(4'-methylsulfonylphenyl)[1,2-α]imidazopyridine were dissolved in alcohol and salified with 150 g. of tartaric acid. By chilling, the 2(4'-methylsulfonylphenyl)[1,2-α]imidazopyridine monotartrate was obtained as a crystalline powder, soluble in water.

The following acid addition salts were prepared in a similar fashion:

Monohydrochloride of 2(4'-methylsulfonylphenyl)
  3-morpholinomethyl[1,2-α]imidazopyridine.
Dihydrochloride of 2(4'-methylsulfonylphenyl)
  3-morpholinomethyl[1,2-α]imidazopyridine.
Monomaleate of 2(4'-methylmercaptophenyl)
  3-piperidinomethyl[1,2-α]imidazopyridine.

We claim:
1. 2(2' - methylmercaptophenyl)[1,2 - α]imidazopyridine.
2. 2(4' - methylmercaptophenyl)[1,2 - α]imidazopyridine.
3. 2(4' - methylsulfonylphenyl)[1,2 - α]imidazopyridine.
4. 2(4' - methylsulfonylphenyl) - 7 - methyl[1,2-α]imidazopyridine.
5. 2(4' - methylsulfonylphenyl) - 6 - methoxy-[1,2-α]imidazopyridine.
6. 2(4' - methylsulfonylphenyl)-3-morpholinomethyl-[1,2-α]imidazopyridine and acid addition salts thereof.
7. 2(4' - methylsulfonylphenyl - 3 - dimethylamino 6-methyl[1,2-α]imidazopyridine and acid addition salts thereof.
8. 2(4' - methylsulfonylphenyl - 3-(4"-β-hydroxyethyl) piperazinomethyl-[1,2-α]imidazopyridine and acid addition salts thereof.
9. An (1,2-α) imidazopyridine of the formula:

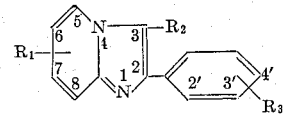

wherein $R_1$ is a radical attached to the imidazopyridine ring at one of positions 5 to 8 inclusive and is selected from the group consisting of hydrogen, lower alkyl and lower alkoxy; $R_2$ is a radical selected from the class consisting of hydrogen and disubstituted aminomethyl having the formula

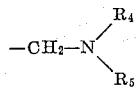

wherein $R_4$ and $R_5$ are lower alkyl or together with the nitrogen form a heterocyclic ring selected from the class consiting of pyrrolidino, piperidino, morpholino, piperazino, methyl piperazino and (β-hydroxyethyl) piperazino; and $R_3$ is a radical attached to the benzene nucleus at one of positions 2' to 4' inclusive and is selected from the class consisting of lower alkylmercapto, lower alkylsulfoxy, and lower alkylsulfonyl.

10. An acid addition salt of an (1,2-α) imidazopyridine according to claim 9.

11. Process for producing a 3-substituted (1,2-α) imidazopyridine which comprises reacting an (1,2-α) imidazopyridine of the formula

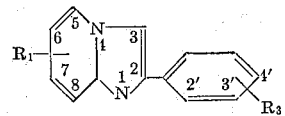

wherein $R_1$ and $R_3$ are defined as in claim 9, with formaldehyde and an amine having the formula

wherein $R_4$ and $R_5$ are defined as in claim 9, under the conditions of the Mannich reaction, and recovering the 3-substituted (1,2-α) imidazopyridine.

12. Process according to claim 11 wherein 2-(4'-methylsulfonylphenyl)1,2 imidazopyridine is condensed with formaldehyde and morpholine to obtain 2-(4'-methylsulfonylphenyl)-3-morpholino methyl-(1,2-α) imidazopyridine.

References Cited by the Examiner

UNITED STATES PATENTS 3,147,270   9/1964   Anderson   260—309.6

OTHER REFERENCES

Hoi et al.: "Bulletin Societe Chimique De France," Ser. 5, May–September 1961, pages 1344–1346.

ALEX MAZEL, *Primary Examiner.*

J. TOVAR, *Assistant Examiner.*